(12) United States Patent
Zhang et al.

(10) Patent No.: US 12,052,777 B2
(45) Date of Patent: *Jul. 30, 2024

(54) SYSTEM AND METHOD FOR PROVIDING TIME DOMAIN ALLOCATIONS IN A COMMUNICATION SYSTEM

(71) Applicant: TELEFONAKTIEBOLAGET LM ERICSSON (PUBL), Stockholm (SE)

(72) Inventors: Jianwei Zhang, Solna (SE); Stefan Parkvall, Bromma (SE); Fredrik Ovesjö, Älvsjö (SE); Zhipeng Lin, Nanjing (CN); Jingya Li, Gothenburg (SE); Xingqin Lin, San Josè, CA (US); Jung-Fu Cheng, Fremont, CA (US); Robert Baldemair, Solna (SE); Asbjörn Grövlen, Stockholm (SE); Mattias Frenne, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,480

(22) Filed: Jul. 14, 2023

(65) Prior Publication Data
US 2024/0057180 A1  Feb. 15, 2024

Related U.S. Application Data

(63) Continuation of application No. 17/970,204, filed on Oct. 20, 2022, now Pat. No. 11,832,319, which is a (Continued)

(30) Foreign Application Priority Data

Apr. 4, 2018 (WO) ................ PCT/CN2018/081844

(51) Int. Cl.
*H04W 76/11* (2018.01)
*H04W 56/00* (2009.01)
(Continued)

(52) U.S. Cl.
CPC .......... *H04W 76/11* (2018.02); *H04W 56/001* (2013.01); *H04W 72/0446* (2013.01);
(Continued)

(58) Field of Classification Search
CPC ............... H04W 76/11; H04W 56/001; H04W 72/0446; H04W 72/0466; H04W 72/30; H04W 72/23; H04W 72/53
See application file for complete search history.

(56) References Cited

U.S. PATENT DOCUMENTS

2013/0163536 A1* 6/2013 Anderson ............. H04L 5/0007
370/329
2013/0196701 A1 8/2013 Tirola et al.
(Continued)

FOREIGN PATENT DOCUMENTS

CN 101385381 A 3/2009
CN 106031067 A 10/2016
(Continued)

OTHER PUBLICATIONS

Ericsson, "DL/UL resources allocation", 3GPP TSG-RAN1#92, Athens, Greece, Feb. 26-Mar. 2, 2018, pp. 1-9, R1-1803231, 3GPP.
(Continued)

*Primary Examiner* — Jael M Ulysse

(57) ABSTRACT

A system and method for providing time domain allocations in a communication system. In an embodiment, an apparatus operable in a communication system and including processing circuitry is configured to receive an indication of a time domain allocation in downlink control information associated with a radio network temporary identifier ("RNTI")
(Continued)

identifying the apparatus, and employ the time domain allocation associated with the RNTI for transmissions associated with the apparatus. In another embodiment, an apparatus operable in a communication system and including processing circuitry is configured to associate a time domain allocation with a RNTI identifying a user equipment, and provide an indication of the time domain allocation in downlink control information to allow the user equipment to employ the time domain allocation associated with the RNTI for transmissions associated therewith.

16 Claims, 9 Drawing Sheets

Related U.S. Application Data continuation of application No. 17/043,155, filed as application No. PCT/IB2019/050883 on Feb. 4, 2019, now Pat. No. 11,516,858.

(51) Int. Cl.
*H04W 72/044* (2023.01)
*H04W 72/0446* (2023.01)
*H04W 72/23* (2023.01)
*H04W 72/30* (2023.01)
*H04W 72/53* (2023.01)

(52) U.S. Cl.
CPC ....... *H04W 72/0466* (2013.01); *H04W 72/23* (2023.01); *H04W 72/30* (2023.01); *H04W 72/53* (2023.01)

(56) References Cited

U.S. PATENT DOCUMENTS

| | | | |
|---|---|---|---|
| 2017/0367046 A1* | 12/2017 | Papasakellariou | H04W 72/23 |
| 2018/0324770 A1* | 11/2018 | Nogami | H04L 5/005 |
| 2019/0082448 A1* | 3/2019 | Nogami | H04L 5/0053 |
| 2019/0149365 A1* | 5/2019 | Chatterjee | H04L 25/0226 370/329 |
| 2019/0223084 A1* | 7/2019 | Wilson et al. | H04W 76/11 |
| 2019/0289530 A1* | 9/2019 | Ko | H04L 5/001 |
| 2020/0154376 A1* | 5/2020 | Ko | H04W 72/30 |

FOREIGN PATENT DOCUMENTS

| | | |
|---|---|---|
| EP | 3439408 A1 | 2/2019 |
| JP | 2010178130 A | 8/2010 |
| JP | 2017530605 A | 10/2017 |
| JP | 7230057 B2 | 2/2023 |
| KR | 20160138469 A | 12/2016 |
| KR | 20170039269 A | 4/2017 |
| WO | 2015174805 A1 | 11/2015 |
| WO | 2016121910 A1 | 8/2016 |
| WO | 2017169003 A1 | 10/2017 |
| WO | 2017169611 A1 | 10/2017 |
| WO | 2017183252 A1 | 10/2017 |

OTHER PUBLICATIONS

Ericsson, "Summary of 7.1.3.1.4 (DCI contents and formats)", 3GPP TSG-RAN1#92, Athens, Greece, Feb. 26-Mar. 2, 2018, pp. 1-19, R1-1803232, 3GPP.

Ericsson, "Summary of 7.1.3.3.1 (Resource allocation)", TSG-RAN WG1 #92, Athens, Greece, Feb. 26-Mar. 2, 2018, pp. 1-14, R1-1803233, 3GPP.

* cited by examiner

SYSTEM AND METHOD FOR PROVIDING TIME DOMAIN ALLOCATIONS IN A COMMUNICATION SYSTEM

The present application is a continuation of U.S. application Ser. No. 17/970,204, filed Oct. 20, 2022, which is a continuation of U.S. application Ser. No. 17/043,155, filed Sep. 29, 2020, which is 371 of International Application No. PCT/IB2019/050883, filed Feb. 4, 2019, now U.S. Pat. No. 11,516,858, which claims the benefit of and priority to international application PCT/CN2018/081844, filed Apr. 4, 2018, entitled "SYSTEM AND METHOD FOR PROVIDING TIME DOMAIN ALLOCATIONS IN A COMMUNICATION SYSTEM," the disclosures of which are hereby incorporated herein by reference in their entirety.

TECHNICAL FIELD

The present disclosure is directed, in general, to the communication systems and, more specifically, to a system and method for providing time domain allocations in a communication system.

BACKGROUND

In wireless communication systems, such as Long Term Evolution ("LTE") and New Radio ("NW") standards in the Third Generation Partnership Program ("3GPP"), resources for uplink ("UL") transmissions are normally scheduled by a network node (e.g., a base station). Both the time domain and frequency domain resource allocations for the downlink ("DL") and uplink data transmissions are indicated as part of different downlink control information ("DCI") elements in a physical downlink control channel ("PDCCH"). DCI format 0 carries the uplink grant that specifies resources for the uplink transmissions along with other parameters such as modulation and coding schemes and power control parameters. DCI format 1 is used to carry downlink resource assignment together with other control information such as modulation and coding schemes.

Before radio resource control is configured, however, a user equipment may not have the information such as a configured table for the time domain allocation. Thus, the user equipment does not have the time domain allocation for downlink and uplink access before the radio resource control configuration is received. Accordingly, what is needed in the art is a system and method for time domain allocations in a communication system.

SUMMARY

These and other problems are generally solved or circumvented, and technical advantages are generally achieved, by advantageous embodiments of the present disclosure for a system and method for providing time domain allocations in a communication system. In an embodiment, an apparatus operable in a communication system and including processing circuitry is configured to receive an indication of a time domain allocation in downlink control information associated with a radio network temporary identifier ("RNTI") identifying the apparatus, and employ the time domain allocation associated with the RNTI for transmissions associated with the apparatus.

In another embodiment, an apparatus operable in a communication system and including processing circuitry is configured to associate a time domain allocation with a RNTI identifying a user equipment. The apparatus is also configured to provide an indication of the time domain allocation in downlink control information to allow the user equipment to employ the time domain allocation associated with the RNTI for transmissions associated therewith.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION

Figure 1:
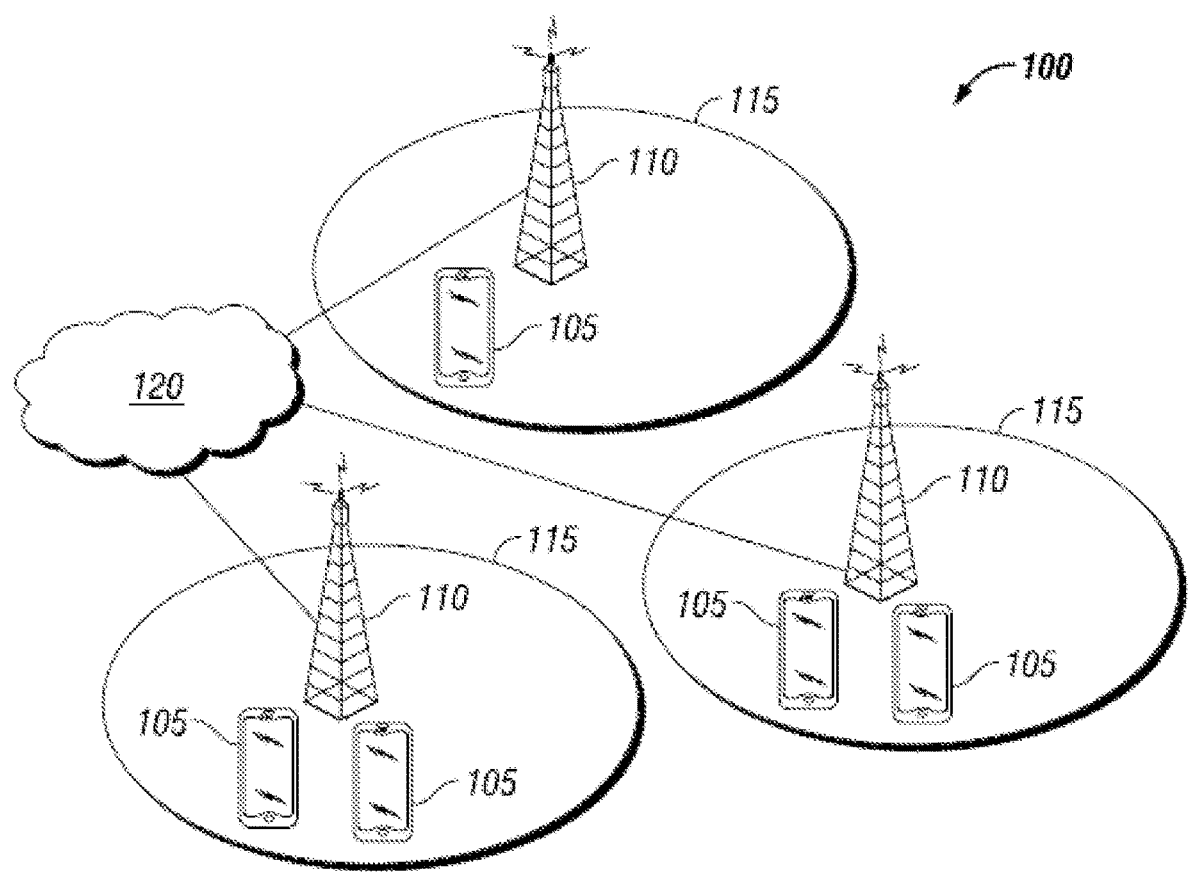
FIGS. 1 to 3 illustrate diagrams of embodiments of a communication system, and portions thereof.

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules for providing time domain allocations in a communication system. While the principles will be described in the environment of a Third Generation Partnership Program ("3GPP") Long Term Evolution ("LTE") and/or Fifth Generation ("5G") communication system, any environment such as a Wi-Fi wireless communication system is well within the broad scope of the present disclosure.

In some embodiments, a non-limiting term user equipment ("UE") is used. The user equipment can be any type of wireless communication device—with or without an active user—capable of communicating with a network node or another user equipment over radio signals. The user equipment may be any device that has an addressable interface (e.g., an Internet protocol ("IP") address, a Bluetooth identifier ("ID"), a near-field communication ("NFC") ID, etc.), a cell radio network temporary identifier ("C-RNTI"), and/ or is intended for accessing services via an access network and configured to communicate over the access network via the addressable interface. The user equipment may include, without limitation, a radio communication device, a target device, a device to device ("D2D") user equipment, a machine type user equipment or user equipment capable of machine to machine communication ("M2M"), a sensor device, meter, vehicle, household appliance, medical appliance, media player, camera, a personal computer ("PC"), a tablet, a mobile terminal, a smart phone, a laptop embedded equipment ("LEE"), a laptop mounted equipment ("LME"), a universal serial bus ("USB") dongle, and customer premises equipment ("CPE").

Also, in some embodiments, generic terminology "network node" is used. It can be any kind of network node that may include a radio network node such as base station, radio base station, base transceiver station, base station controller, network controller, multi-standard radio base station, g Node B ("gNB"), new radio ("NR") base station, evolved Node B ("eNB"), Node B, multi-cell/multicast coordination entity ("MCE"), relay node, access point, radio access point, remote radio unit ("RRU") remote radio head ("RRH"), a multi-standard radio base station ("MSR BS"), a core network node (e.g., mobility management entity ("MME"), self-organizing network ("SON") node, a coordinating node, positioning node, minimization of drive test ("MDT") node, or even an external node (e.g., third party node, a node external to the current network), etc. The network node may also include test equipment. The term "radio node" used herein may be used to denote a user equipment or a radio network node. These various nodes will be introduced herein below.

The term "signaling" used herein may include, without limitation, high-layer signaling (e.g., via radio resource control ("RRC") or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "radio signal measurement" used herein may refer to any measurement performed on radio signals. The radio signal measurements can be absolute or relative. The radio signal measurement may be called as signal level that may be signal quality and/or signal strength. The radio signal measurements can be, for instance, intra-frequency, inter-frequency, inter-radio access technology ("RAT") measurements, carrier aggregation ("CA") measurements. The radio signal measurements can be unidirectional (e.g., downlink ("DL") or uplink ("UL")) or bidirectional (e.g., round trip time ("RTT"), Rx-Tx, etc.). Some examples of radio signal measurements include timing measurements (e.g., time of arrival ("TOA"), timing advance, round trip time ("RTT"), reference signal time difference ("RSTD"), Rx-Tx, propagation delay, etc.), angle measurements (e.g., angle of arrival), power-based measurements (e.g., received signal power, reference signal received power ("RSRP"), received signal quality, reference signal received quality ("RSRQ"), signal-to-interference-plus-noise ratio ("SINR"), signal-to-noise ratio ("SNR"), interference power, total interference plus noise, received signal strength indicator ("RSSI"), noise power, etc.), cell detection or cell identification, radio link monitoring ("RLM"), and system information ("SI") reading, etc. The inter-frequency and inter-RAT measurements may be carried out by the user equipment in measurement gaps unless the user equipment is capable of doing such measurement without gaps. Examples of measurement gaps are measurement gap id #0 (each gap of six milliseconds ("ms") occurring every 40 ms), measurement gap id #1 (each gap of six ms occurring every 80 ms), etc. The measurement gaps may be configured by the network node for the user equipment.

Performing a measurement on a carrier may imply performing measurements on signals of one or more cells operating on that carrier or performing measurements on signals of the carrier (a carrier specific measurement such as RSSI). Examples of cell specific measurements are signal strength, signal quality, etc.

The term measurement performance may refer to any criteria or metric that characterizes the performance of the measurement performed by a radio node. The term measurement performance is also called as measurement requirement, measurement performance requirements, etc. The radio node meets one or more measurement performance criteria related to the performed measurement. Examples of measurement performance criteria are measurement time, number of cells to be measured with the measurement time, measurement reporting delay, measurement accuracy, measurement accuracy with respect to a reference value (e.g., ideal measurement result), etc. Examples of measurement time are measurement period, cell identification period, evaluation period, etc.

The embodiments described herein may be applied to any multicarrier system wherein at least two radio network nodes can configure radio signal measurements for the same user equipment. One specific example scenario includes a dual connectivity deployment with LTE primary cell ("PCell") and NR primary secondary cell ("PSCell"). Another example scenario is a dual connectivity deployment with NR PCell and NR PSCell.

Figure 2:
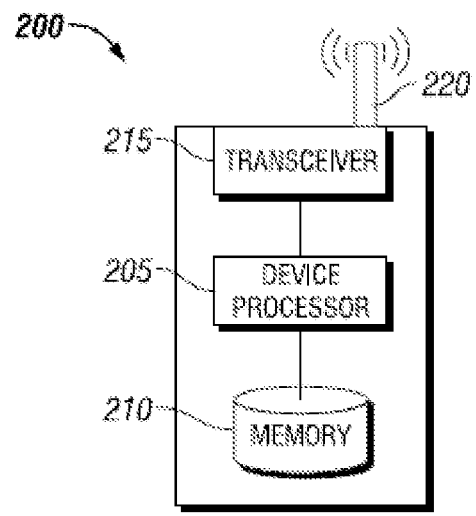
Figure 3:
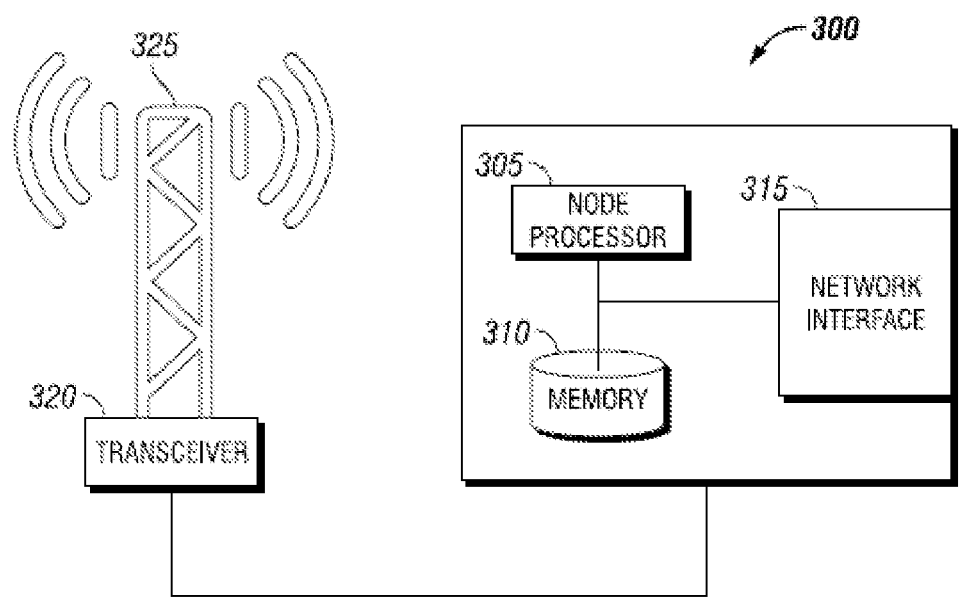

Referring initially to FIGS. 1 to 3, illustrated are diagrams of embodiments of a communication system 100, and portions thereof. As shown in FIG. 1, the communication system 100 includes one or more instances of user equipment (generally designated 105) in communication with one or more radio access nodes (generally designated 110). The communication network 100 is organized into cells 115 that are connected to a core network 120 via corresponding radio access nodes 110. In particular embodiments, the communication system 100 may be configured to operate according to specific standards or other types of predefined rules or procedures. Thus, particular embodiments of the communication system 100 may implement communication standards, such as Global System for Mobile Communications ("GSM"), Universal Mobile Telecommunications System ("UMTS"), Long Term Evolution ("LTE"), and/or other suitable 2G, 3G, 4G, or 5G standards; wireless local area network ("WLAN") standards, such as the IEEE 802.11 standards; and/or any other appropriate wireless communication standard, such as the Worldwide Interoperability for Microwave Access ("WiMax"), Bluetooth, and/or ZigBee standards.

In addition to the devices mentioned above, the user equipment 105 may be a portable, pocket-storable, hand-held, computer-comprised, or vehicle-mounted mobile device, enabled to communicate voice and/or data, via a wireless or wireline connection. A user equipment 105 may have functionality for performing monitoring, controlling, measuring, recording, etc., that can be embedded in and/or controlled/monitored by a processor, central processing unit ("CPU"), microprocessor, ASIC, or the like, and configured for connection to a network such as a local ad-hoc network or the Internet. The user equipment 105 may have a passive communication interface, such as a quick response (Q) code, a radio-frequency identification ("RFID") tag, an NFC tag, or the like, or an active communication interface, such as a modem, a transceiver, a transmitter-receiver, or the like. In an internet of things ("IoT") scenario, the user equipment 105 may include sensors, metering devices such as power meters, industrial machinery, or home or personal appliances (e.g., refrigerators, televisions, personal wearables such as watches) capable of monitoring and/or reporting on its operational status or other functions associated with its operation.

Alternative embodiments of the user equipment 105 may include additional components beyond those shown in FIG. 1 that may be responsible for providing certain aspects of the functionality, including any of the functionality described herein and/or any functionality necessary to support the solution described herein. As just one example, the user equipment 105 may include input interfaces, devices and circuits, and output interfaces, devices and circuits. The input interfaces, devices, and circuits are configured to allow input of information into the user equipment 105, and are connected to a processor to process the input information. For example, input interfaces, devices, and circuits may include a microphone, a proximity or other sensor, keys/buttons, a touch display, one or more cameras, a universal serial bus ("USB") port, or other input elements. Output interfaces, devices, and circuits are configured to allow output of information from the user equipment 105, and are connected to the processor to output information from the user equipment 105. For example, output interfaces, devices, or circuits may include a speaker, a display, vibrating circuitry, a USB port, a headphone interface, or other output elements. Using one or more input and output interfaces, devices, and circuits, the user equipment 105 may communicate with end users and/or the wireless network, and allow them to benefit from the functionality described herein.

As another example, the user equipment 105 may include a power source. The power source may include power management circuitry. The power source may receive power from a power supply, which may either be internal or external to the power source. For example, the user equipment 105 may include a power supply in the form of a battery or battery pack that is connected to, or integrated into, the power source. Other types of power sources, such as photovoltaic devices, may also be used. As a further example, the user equipment 105 may be connectable to an external power supply (such as an electricity outlet) via an input circuitry or interface such as an electrical cable, whereby the external power supply supplies power to the power source.

The radio access nodes 110 such as base stations are capable of communicating with the user equipment 105 along with any additional elements suitable to support communication between user equipment 105 or between a user equipment 105 and another communication device (such as a landline telephone). The radio access nodes 110 may be categorized based on the amount of coverage they provide (or, stated differently, their transmit power level) and may then also be referred to as femto base stations, pico base stations, micro base stations, or macro base stations. The radio access nodes 110 may also include one or more (or all) parts of a distributed radio access node such as centralized digital units and/or remote radio units ("RRUs"), sometimes referred to as remote radio heads ("RRHs"). Such remote radio units may or may not be integrated with an antenna as an antenna integrated radio. Parts of a distributed radio base stations may also be referred to as nodes in a distributed antenna system ("DAS"). As a particular non-limiting example, a base station may be a relay node or a relay donor node controlling a relay.

The radio access nodes 110 may be composed of multiple physically separate components (e.g., a NodeB component and a radio network controller ("RNC") component, a base transceiver station ("BTS") component and a base station controller ("BSC") component, etc.), which may each have their own respective processor, memory, and interface components. In certain scenarios in which the radio access nodes 110 include multiple separate components (e.g., BTS and BSC components), one or more of the separate components may be shared among several network nodes. For example, a single RNC may control multiple NodeBs. In such a scenario, each unique NodeB and BSC pair, may be a separate network node. In some embodiments, the radio access nodes 110 may be configured to support multiple radio access technologies ("RATs"). In such embodiments, some components may be duplicated (e.g., separate memory for the different RATs) and some components may be reused (e.g., the same antenna may be shared by the RATs).

Although the illustrated user equipment 105 may represent communication devices that include any suitable combination of hardware and/or software, the user equipment 105 may, in particular embodiments, represent devices such as the example user equipment 200 illustrated in greater detail by FIG. 2. Similarly, although the illustrated radio access node 110 may represent network nodes that include any suitable combination of hardware and/or software, these nodes may, in particular embodiments, represent devices such as the example radio access node 300 illustrated in greater detail by FIG. 3.

As shown in FIG. 2, the example user equipment 200 includes a processor (or processing circuitry) 205, a memory 210, a transceiver 215 and antennas 220. In particular embodiments, some or all of the functionality described above as being provided by machine type communication ("MTC") and machine-to-machine ("M2M") devices, and/or any other types of communication devices may be provided by the device processor 205 executing instructions stored on a computer-readable medium, such as the memory 210 shown in FIG. 2. Alternative embodiments of the user equipment 200 may include additional components (such as the interfaces, devices and circuits mentioned above) beyond those shown in FIG. 2 that may be responsible for providing certain aspects of the device's functionality, including any of the functionality described above and/or any functionality necessary to support the solution described herein.

As shown in FIG. 3, the example radio access node 300 includes a processor (or processing circuitry) 305, a memory 310, a transceiver 320, a network interface 315 and antennas 325. In particular embodiments, some or all of the functionality described herein may be provided by a base station, a radio network controller, a relay station and/or any other type of network nodes (see examples above) in connection with the node processor 305 executing instructions stored on a computer-readable medium, such as the memory 310 shown in FIG. 3. Alternative embodiments of the radio access node 300 may include additional components responsible for providing additional functionality, including any of the functionality identified above and/or any functionality necessary to support the solution described herein.

The processors, which may be implemented with one or a plurality of processing devices, performs functions associated with its operation including, without limitation, precoding of antenna gain/phase parameters, encoding and decoding of individual bits forming a communication message, formatting of information and overall control of a respective communication device. Exemplary functions related to management of communication resources include, without limitation, hardware installation, traffic management, performance data analysis, configuration management, security, billing and the like. The processors may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The processors may include one or more of radio frequency ("RF") transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset.

The processors may be configured to perform any determining operations described herein. Determining as performed by the processors may include processing information obtained by the processor by, for example, converting the obtained information into other information, comparing the obtained information or converted information to information stored in the respective device, and/or performing one or more operations based on the obtained information or converted information, and as a result of the processing making a determination.

The memories may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication device to perform its intended tasks. Of course, the memories may form a data buffer for data transmitted to and from the same. Exemplary embodiments of the system, subsystems, and modules as described herein may be implemented, at least in part, by computer software executable by processors, or by hardware, or by combinations thereof.

The transceivers modulate information onto a carrier waveform for transmission by the respective communication device via the respective antenna(s) to another communication device. The respective transceiver demodulates information received via the antenna(s) for further processing by other communication devices. The transceiver is capable of supporting duplex operation for the respective communication device. The network interface performs similar functions as the transceiver communicating with a core network.

The antennas may be any type of antenna capable of transmitting and receiving data and/or signals wirelessly. In some embodiments, the antennas may include one or more omni-directional, sector or panel antennas operable to transmit/receive radio signals between, for example, 2 gigahertz ("GHz") and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Figure 4:
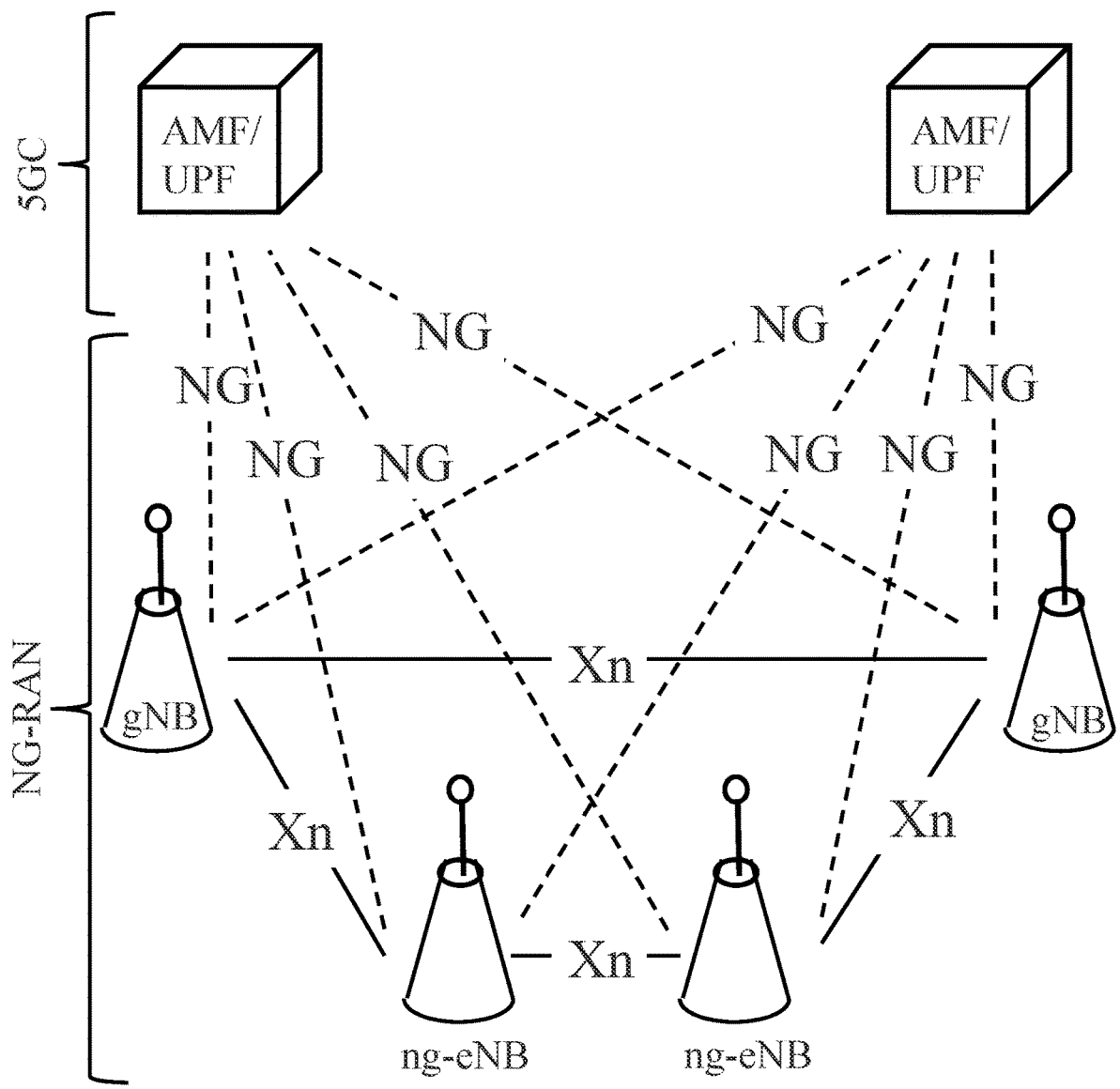
FIGS. 4 to 7 illustrate diagrams of embodiments of communication systems.

Turning now to FIG. 4, illustrated is a system level diagram of an embodiment of a communication system such as a 5G/NR communications system. The NR architecture includes terminology such as "NG" (or "ng") denoting new radio, "eNB" denoting an LTE eNodeB, "gNB" denoting a NR base station ("BS," one NR BS may correspond to one or more transmission/reception points), a "RAN" denoting a radio access network, "5GC" denoting a Fifth Generation ("5G") core network, "AMF" denoting an access and mobility management function, and "UPF" denoting a user plane function. The lines between network nodes represent interfaces therebetween.

FIG. 4 illustrates an overall NR architecture with eNBs and gNBs communicating over various interfaces. In particular, the gNBs and ng-eNBs are interconnected with each other by an Xn interface. The gNBs and ng-eNBs are also connected by NG interfaces to the 5GC, more specifically to the AMF by the NG-C interface and to the UPF by the NG-U interface, as described in 3GPP Technical Specification ("TS") 23.501. The architecture and the F1 interface for a functional split are defined in 3GPP TS 38.401.

Figure 5:
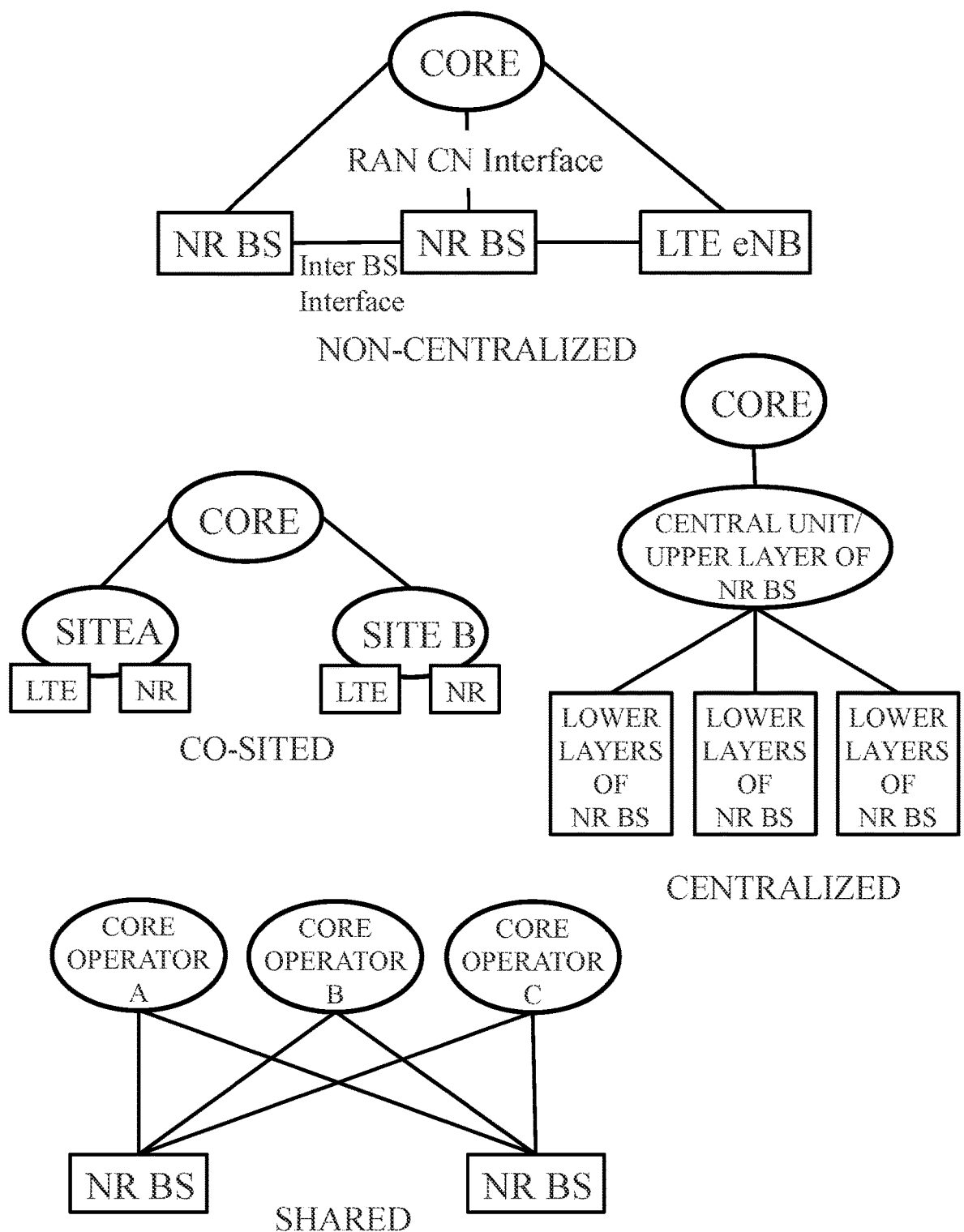

Turning now to FIG. 5, illustrated is a system level diagram of an embodiment of a communication system including 5G/NR deployment examples. The communication system illustrates non-centralized, co-sited, centralized, and shared deployments of NR base stations, LTE base stations, lower levels of NR base stations, and NR base stations connected to core networks.

Both standalone and non-standalone NR deployments may be incorporated into the communication system. The standalone deployments may be single or multi-carrier (e.g., NR carrier aggregation) or dual connectivity with a NR PCell and a NR PSCell. The non-standalone deployments describe a deployment with LTE PCell and NR. There may also be one or more LTE secondary cells ("SCells") and one or more NR SCells.

The following deployment options are captured in NR Work Item Description (RP-170847, "New WID on New Radio Access Technology," NTT DoCoMo, March 2018). The work item supports a single connectivity option including NR connected to 5G-CN ("CN" representing a core network, option 2 in TR 38.801 section 7.1). The work item also supports dual connectivity options including E-UTRA-NR DC ("E-UTRA" represents evolved universal mobile telecommunications system ("UMTS") terrestrial radio access, and "DC" represents dual connectivity) via an evolved packet core ("EPC") where the E-UTRA is the master (Option 3/3a/3x in TR 38.801 section 10.1.2), E-UTRA-NR DC via 5G-CN where the E-UTRA is the master (Option 7/7a/7x in TR 38.801 section 10.1.4), and NR-E-UTRA DC via 5G-CN where the NR is the master (Option 4/4A in TR 38.801 section 10.1.3). Dual connectivity is between E-UTRA and NR, for which the priority is where E-UTRA is the master and the second priority is where NR is the master, and dual connectivity is within NR. The standards and other documents introduced in the present disclosure are incorporated herein by reference.

Figure 6:
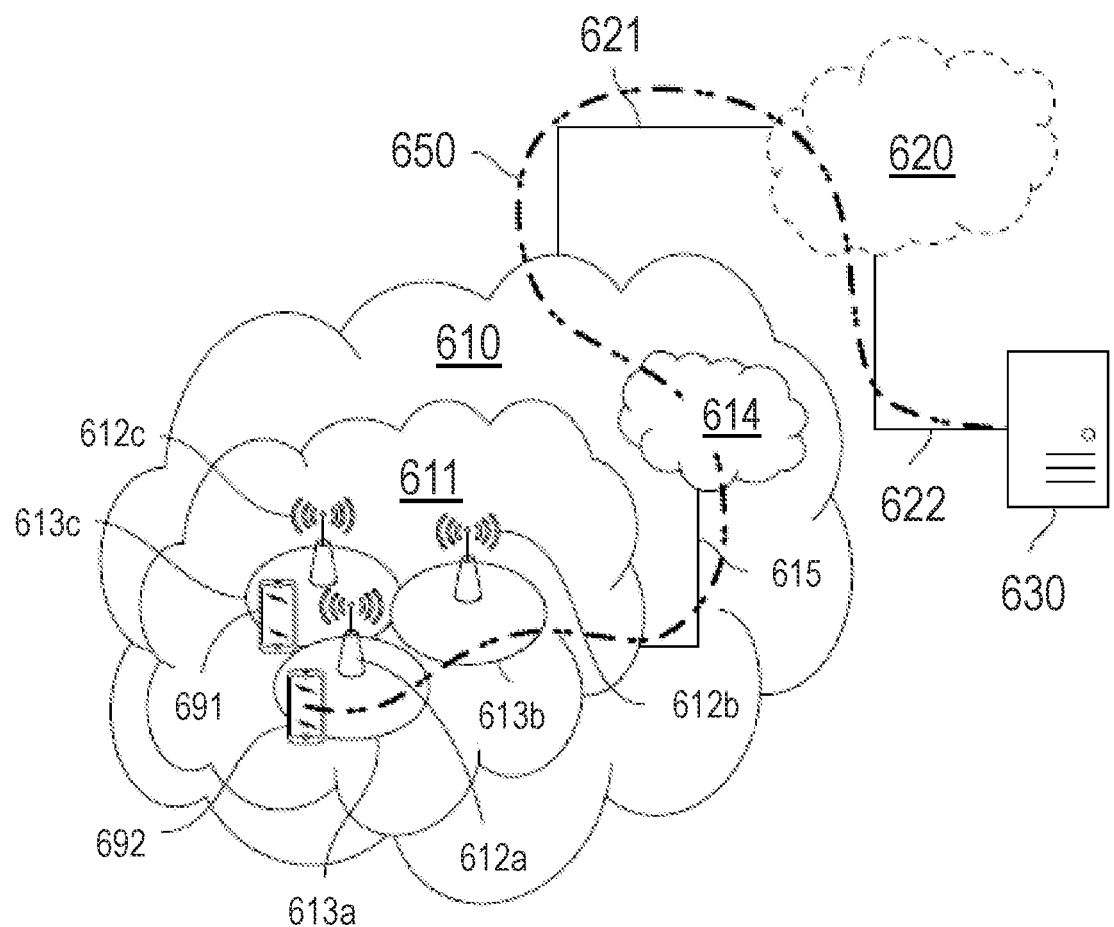

Turning now to FIG. 6, illustrated is a system level diagram of an embodiment of a communication system including a communication network (e.g., a 3GPP-type cellular network) 610 connected to a host computer 630. The communication network 610 includes an access network 611, such as a radio access network, and a core network 614. The access network 611 includes a plurality of base stations 612a, 612b, 612c (also collectively referred to as 612), such as NBs, eNBs, gNBs or other types of wireless access points, each defining a corresponding coverage area 613a, 613b, 613c (also collectively referred to as 613). Each base station 612a, 612b, 612c is connectable to the core network 614 over a wired or wireless connection 615. A first user equipment ("UE") 691 located in coverage area 613c is configured to wirelessly connect to, or be paged by, the corresponding base station 612c. A second user equipment 692 in coverage area 613a is wirelessly connectable to the corresponding base station 612a. While a plurality of user equipment 691, 692 are illustrated in this example, the disclosed embodiments are equally applicable to a situation where a sole user equipment is in the coverage area or where a sole user equipment is connecting to the corresponding base station 612.

The communication network 610 is itself connected to the host computer 630, which may be embodied in the hardware and/or software of a standalone server, a cloud-implemented server, a distributed server or as processing resources in a server farm. The host computer 630 may be under the ownership or control of a service provider, or may be operated by the service provider or on behalf of the service provider. The connections 621, 622 between the communication network 610 and the host computer 630 may extend directly from the core network 614 to the host computer 630 or may go via an optional intermediate network 620. The intermediate network 620 may be one of, or a combination of more than one of, a public, private or hosted network; the intermediate network 620, if any, may be a backbone network or the Internet; in particular, the intermediate network 620 may include two or more sub-networks (not shown).

The communication system of FIG. 6 as a whole enables connectivity between one of the connected user equipment 691, 692 and the host computer 630. The connectivity may be described as an over-the-top ("OTT") connection 650. The host computer 630 and the connected user equipment 691, 692 are configured to communicate data and/or signaling via the OTT connection 650, using the access network 611, the core network 614, any intermediate network 620 and possible further infrastructure (not shown) as intermediaries. The OTT connection 650 may be transparent in the sense that the participating communication devices through which the OTT connection 650 passes are unaware of routing of uplink and downlink communications. For example, a base station 612 may not or need not be informed about the past routing of an incoming downlink communication with data originating from a host computer 630 to be forwarded (e.g., handed over) to a connected user equipment 691. Similarly, the base station 612 need not be aware of the future routing of an outgoing uplink communication originating from the user equipment 691 towards the host computer 630.

Figure 7:
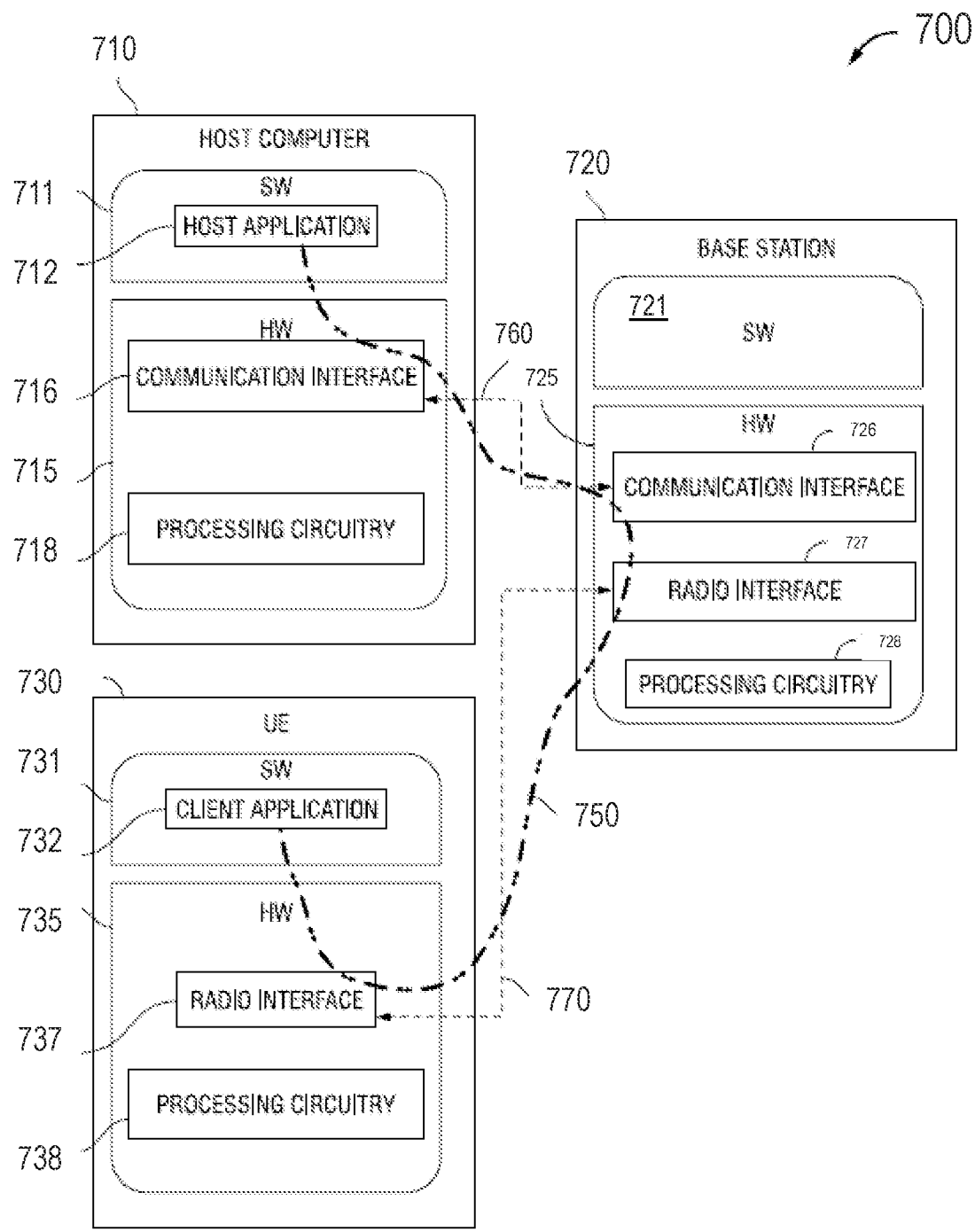

Turning now to FIG. 7, illustrated is a block diagram of an embodiment of a communication system 700. In the communication system 700, a host computer 710 includes hardware 715 including a communication interface 716 configured to set up and maintain a wired or wireless connection with an interface of a different communication device of the communication system 700. The host computer 710 further includes processing circuitry (a processor) 718, which may have storage and/or processing capabilities. In particular, the processing circuitry 718 may include one or more programmable processors, application-specific integrated circuits, field programmable gate arrays or combinations of these (not shown) adapted to execute instructions. The host computer 710 further includes software 711, which is stored in or accessible by the host computer 710 and executable by the processing circuitry 718. The software 711 includes a host application 712. The host application 712 may be operable to provide a service to a remote user, such as a user equipment ("UE") 730 connecting via an OTT connection 750 terminating at the user equipment 730 and the host computer 710. In providing the service to the remote user, the host application 712 may provide user data which is transmitted using the OTT connection 750.

The communication system 700 further includes a base station 720 provided in the communication system 700 including hardware 725 enabling it to communicate with the host computer 710 and with the user equipment 730. The hardware 725 may include a communication interface 726 for setting up and maintaining a wired or wireless connection with an interface of a different communication device of the communication system 700, as well as a radio interface 727 for setting up and maintaining at least a wireless connection 770 with a user equipment 730 located in a coverage area (not shown in FIG. 7) served by the base station 720. The communication interface 726 may be configured to facilitate a connection 760 to the host computer 710. The connection 760 may be direct or it may pass through a core network (not shown in FIG. 7) of the communication system 700 and/or through one or more intermediate networks outside the communication system 700. In the embodiment shown, the hardware 725 of the base station 720 further includes processing circuitry (a processor) 728, which may include one or more programmable processors, application-specific integrated circuits, field programmable gate arrays or combinations of these (not shown) adapted to execute instructions. The base station 720 further has software 721 stored internally or accessible via an external connection.

The user equipment 730 includes hardware 735 having a radio interface 737 configured to set up and maintain a wireless connection 770 with a base station 720 serving a coverage area in which the user equipment 730 is currently located. The hardware 735 of the user equipment 730 further includes processing circuitry (a processor) 738, which may include one or more programmable processors, application-specific integrated circuits, field programmable gate arrays or combinations of these (not shown) adapted to execute instructions. The user equipment 730 further includes software 731, which is stored in or accessible by the user equipment 730 and executable by the processing circuitry 738. The software 731 includes a client application 732. The client application 732 may be operable to provide a service to a human or non-human user via the user equipment 730, with the support of the host computer 710. In the host computer 710, an executing host application 712 may communicate with the executing client application 732 via the OTT connection 750 terminating at the user equipment 730 and the host computer 710. In providing the service to the user, the client application 732 may receive request data from the host application 712 and provide user data in response to the request data. The OTT connection 750 may transfer both the request data and the user data. The client application 732 may interact with the user to generate the user data that it provides.

It is noted that the host computer 710, base station 720 and user equipment 730 illustrated in FIG. 7 may be identical to the host computer 630, one of the base stations 612a, 612b, 612c and one of the user equipment 691, 692 of FIG. 6, respectively. This is to say, the inner workings of these entities may be as shown in FIG. 7 and independently, the surrounding network topology may be that of FIG. 6.

In FIG. 7, the OTT connection 750 has been drawn abstractly to illustrate the communication between the host computer 710 and the use equipment 730 via the base station 720, without explicit reference to any intermediary devices and the precise routing of messages via these devices. Network infrastructure may determine the routing, which it may be configured to hide from the user equipment 730 or from the service provider operating the host computer 710, or both. While the OTT connection 750 is active, the network infrastructure may further take decisions by which it dynamically changes the routing (e.g., on the basis of load balancing consideration or reconfiguration of the network).

A measurement procedure may be provided for the purpose of monitoring data rate, latency and other factors on which the one or more embodiments improve. There may further be an optional network functionality for reconfiguring the OTT connection 750 between the host computer 710 and user equipment 730, in response to variations in the measurement results. The measurement procedure and/or the network functionality for reconfiguring the OTT connection 750 may be implemented in the software 711 of the host computer 710 or in the software 731 of the user equipment 730, or both. In embodiments, sensors (not shown) may be deployed in or in association with communication devices through which the OTT connection 750 passes; the sensors may participate in the measurement procedure by supplying values of the monitored quantities exemplified above, or supplying values of other physical quantities from which software 711, 731 may compute or estimate the monitored quantities. The reconfiguring of the OTT connection 750 may include message format, retransmission settings, preferred routing, etc.; the reconfiguring need not affect the base station 720, and it may be unknown or imperceptible to the base station 720. Such procedures and functionalities may be known and practiced in the art. In certain embodiments, measurements may involve proprietary user equipment signaling facilitating the host computer's 710 measurements of throughput, propagation times, latency and the like. The measurements may be implemented in that the software 711, 731 causes messages to be transmitted, in particular empty or 'dummy' messages, using the OTT connection 750 while it monitors propagation times, errors, etc. Additionally, the communication system 700 may employ the principles as described herein.

In NR, time domain allocation in the DCI is a pointer to one entry in a set of configured allocations provided to a user equipment by radio resource control signaling. The set of configured allocations may have up to 16 entries and each entry has a field of two bits (for the downlink), three bits (for the uplink) that points to a future slot for the allocation, a field of seven bits that indicate the start and duration of the time domain allocation in that slot, a field that specifies whether the allocation is defined relative to the start of a slot or start of the physical downlink shared channel/physical uplink shared channel ("PDSCH/PUSCH") resources.

According to 3GPP RAN1 #91 (Sanya, China, Apr. 16-20, 2018 meeting), the reference point for starting an orthogonal frequency division multiplexing ("OFDM") symbol has little or no radio resource control impact (e.g., slot boundary, start of a control resource set ("CORESET") where the PDCCH was found, or part of the table/equation in RAN1 specifications). The aggregation factor (1, 2, 4, 8 for downlink or uplink) is semi-statically configured separately (i.e., not part of a table), which has no additional radio resource control impact for using the aggregation factor along with the tables.

According to 3GPP RAN1 #90bis, for both slot and mini-slot, the scheduling DCI can provide an index into a user equipment specific table giving the OFDM symbols used for the PDSCH (or PUSCH) transmissions including the starting OFDM symbol and length for the OFDM symbols of the allocation. Also, the number of tables (e.g., one or more), the inclusion of the slots used for multi-slot/multi-mini-slot scheduling or slot index for cross-slot scheduling, and if slot frame indication ("SFI") support is necessary for non-contiguous allocations can also be analyzed. For remaining minimum system information ("RMSI") scheduling, at least one table entry should be fixed in the specification.

In 3GPP meeting RAN1 Ad-Hoc #180 1, NR supports a DCI format having the same size as the DCI format 1_0 to be used for scheduling RMSI/OSI ("OSI" represents other system information) for paging, and for random access. In 3GPP meeting RAN1 #92, the time domain allocation table can be configured in the system information block 1 ("SIB1") (RMSI) according to a request RAN2 to provide the RRC-configured table in the RMSI to configure PDSCH and PUSCH symbol allocation for PDSCH/PUSCH scheduling after the RMSI, where the RRC-configurable table via dedicated signaling was previously specified in RAN1.

As mentioned above, before the radio resource control is configured, the user equipment does not have the configured table for time domain allocation. Thus, the user equipment does not have the time domain allocation for downlink and uplink access before the radio resource control configuration is received.

For broadcast information, the same PDCCH information is transmitted to all the user equipment, but the user equipment may (or may not) have received the radio resource control configured time domain allocation list. Thus, it is up to each user equipment to consistently interpret the time domain allocation, which is uncertain without direction from the network or without a predetermined standard. While at least one table entry has to be reserved for the RMSI, the flexibility of using the table for other purposes is limited.

The time domain allocation table of fixed pre-defined number of entries is not sufficient to cover different configuration requirements, especially when the network dynamically changes slot configurations for different reasons. There may be ambiguity between the network and user equipment for which table (such as the RRC-reconfigured table or SIB1 configured table) is valid for the user equipment to interpret the time domain allocation for an uplink/downlink transmission.

As disclosed herein, a system and method provides a technique to carry time domain allocation in a signaling associated with radio network temporary identifiers ("RNTIs"). A system and method is also disclosed to interpret the time domain allocation in the signaling associated with the RNTIs.

The system associates the interpretation and presentation of the time domain allocation in the DCI with the RNTI types. As the RNTIs are used by the network for certain kind of functions or services, it would be beneficial to have that association for a flexible network functionality. The system information can be transmitted with more flexible time domain allocations. The network has the freedom to configure the slot with any pattern of downlink/uplink symbols and divide the resources between the PDSCH and other channels in the time domain.

The time domain allocation table in the RRC-configuration may be independent of time domain allocation of system information. The network can re-configure the time domain allocation table without reserving any fixed index for transmitting a system information block ("SIB"). The system as described herein reduces ambiguity between the network and user equipment about the time domain allocation.

The system information ("SI")-RNTI provides initial network system configurations to the user equipment. Since no other network information that characterize the network configuration may have been indicated to the user equipment, the time domain allocation should be more flexible to satisfy different network requirements. The below examples emphasize configuration flexibility for time domain allocation associated with the SI-RNTI.

One example is for PDCCH to be scrambled with the SI-RNTI, the time domain resource assignment including a start and length indicator value ("SLIV"), a time offset K0, demodulation reference signals ("DMRS") type other than PDCCH scrambled with a cell ("C")-RNTI using indexes to point to a table. An example for DCI content of DCI1_0 scrambled with SI-RNTI is the time domain resource assignment equaling seven bits, a time offset K0 of one bit, and the DMRS type A or B of one bit. For the DMRS, it is possible to define a table that maps the start symbol ("S") and symbol length ("L") to certain types, and thus save one bit. (Scrambling a PDCCH or DCI with RNTI, whether C-RNTI, SI-RNTI, or any other RNTI, as described herein refers to a procedure by which the cyclic redundancy check parity bits of a DCI transmission corresponding to a PDCCH are scrambled with an associated RNTI.)

The time domain allocation for system information carried by the PDCCH scrambled with SI-RNTI should have the flexibility of any start symbol and symbol lengths within one slot. The time domain allocation should not be limited with a pre-defined fixed number of configuration entries.

Another example is to use a different number of bits, most probably more bits, to indicate time domain resource assignment of the SI-RNTI than that in C-RNTI. A pre-defined table may have 32, 64 or 128 entries.

Another example is to make use of existing information (e.g., information in a master information block ("MIB")) to interpret the time domain allocation to be more flexible. To support more entries in the PDSCH table, the S position can be related to the DL-DMRS-Type A-position={2,3} that is signaled in the master information block ("MIB"), which one will be used is likely coupled in practice to the values signaled in DL-DMRS-Type A-position. So, if more default scheduling possibilities would be beneficial, then TABLE 2 below is possible, where x=DL-DMRS-Type A-position.

The way to interpret the time domain allocation in signaling should be differentiated/associated with RNTIs. This is to improve the flexibility of the network to configure the user equipment with different tables associated with different RNTIs. It also helps to reduce the ambiguity between network and user equipment when multiple RRC configured tables have been received by the user equipment.

One example is for SI-RNTI, the user equipment may use a fixed pre-defined table such as a table defined in a specification. At a later time, a RRC-reconfigured table is provided, and the SI-RNTI should be interpreted the same way as a user equipment without receiving RRC configuration. And for C-RNTI, the user equipment may use the RRC-configured table.

The time domain allocation for the SI-RNTI may use a different table from the RRC configured table even after the user equipment has received a RRC-reconfigured table. For random access ("RA")-RNTI, paging ("P")-RNTI, temporary cell ("TC")-RNTI, configured scheduling ("CS")-RNTI and cell ("C")-RNTI etc., the tables used to interpret the time domain allocation can be different. The examples are mainly on SI-RNTI verses C-RNTI, but it may apply to other RNTIs because the RNTI is coupled with certain group of functions in a network.

Thus, the interpretation and presentation of the time domain allocation in the DCI is associated with the RNTI types. As the RNTIs are used by the network for certain kind of functions or services, it would be beneficial to have that association for a flexible network functionality.

According to 3GPP RAN1 #91, one table is specified for uplink transmissions and one table for downlink transmissions configured by radio resource control in Release 15. See also document R1-1802913, entitled "Remaining Details in UL Transmission Procedures." Each table is up to 16 rows. In the table, each row is configured by radio resource control with an offset K0 using two bits (for the downlink table), K2 using three bits (for the uplink table), a six bit index into a table/equation in the RAN1 specifications capturing valid combinations of a start symbol ("S") and length ("L"), jointly encoded, and PDSCH mapping type A or B.

As further described in 3GPP RAN1 #91, for the reference point starting an orthogonal frequency division multiplexing ("OFDM") symbol, there is no radio resource control ("RRC") impact (e.g., slot boundary, start of control resource set ("CORESET") where the PDCCH was found, or part of the table/equation in RAN1 specifications). An aggregation factor (1, 2, 4, 8 for the downlink ("DL") or uplink ("UL")) is semi-statically configured separately (i.e., is not part of a table). There is no additional RRC impact on how to use the aggregation factor along with the tables.

The 3GPP RAN1 #91 does not specify the time domain allocation before the RRC configuration is received. This includes, for example, the time domain resource assignment for MSG2, MSG3 and the remaining minimum system information ("RMSI"). For that, some default set of values can be defined for DL and UL in the specification. A default PDSCH table can be used to address the time domain resource allocation before the RRC configuration is received. These PDCCHs will be carried in the RMSI CORESET that contains PDSCH allocation for RMSI, paging, or MSG2.

Figure 8:
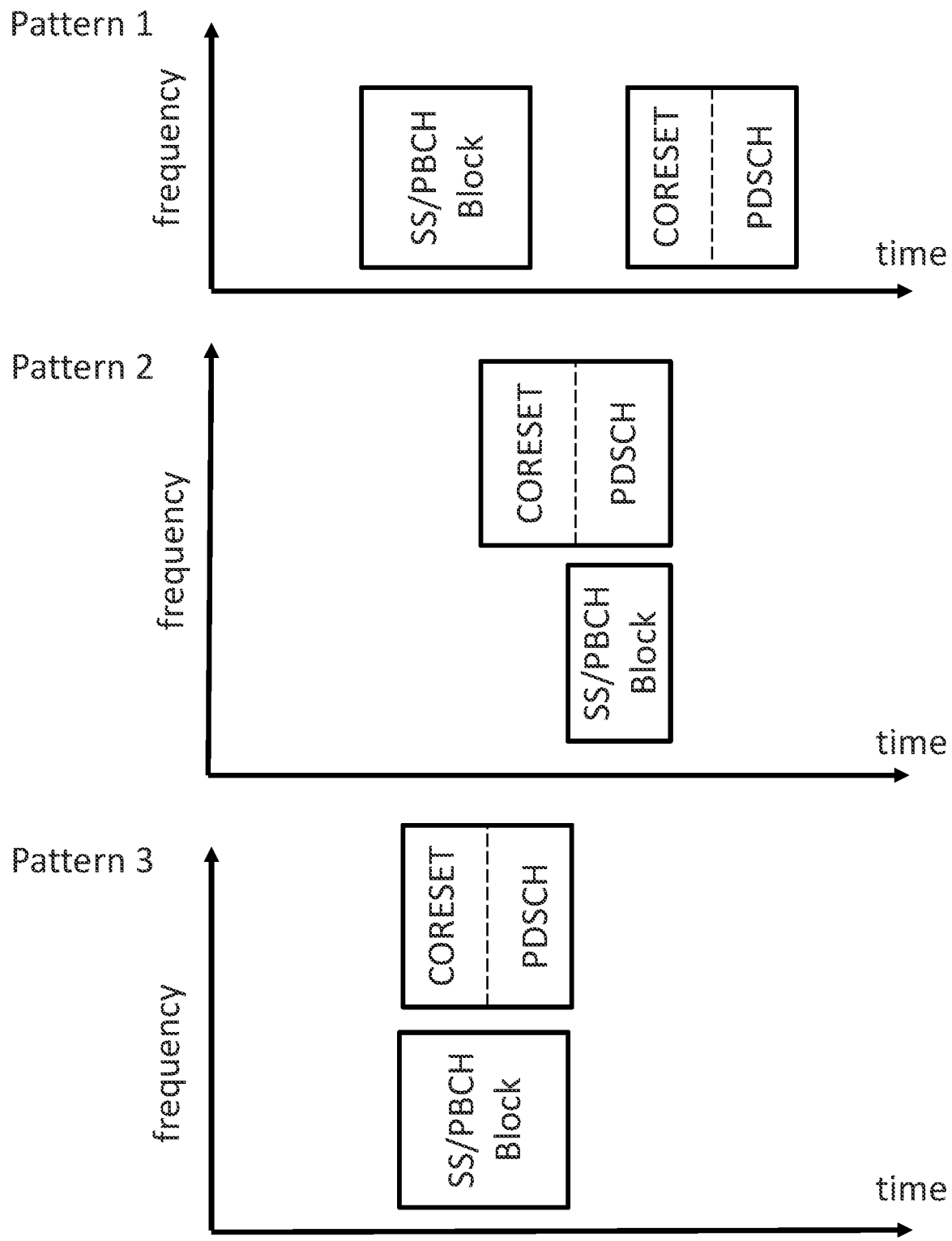
FIG. 8 illustrates graphical representations of embodiments of synchronization signal/physical broadcast channel ("SS/PBCH") block and remaining minimum system information ("RMSI") control resource set ("CORESET") multiplexing types.

Turning now to FIG. 8, illustrated are graphical representations of embodiments of synchronization signal/physical broadcast channel ("SS/PBCH") block and RMSI CORESET multiplexing types. As illustrated in FIG. 8, there are three multiplexing patterns between SS/PBCH and RMSI CORESET, where for multiplexing patterns 2 and 3, the timing is given directly by the RMSI CORSET configuration; hence no rows in the default table may be reserved for this purpose. For multiplexing pattern 2, the PDSCH starts from the first symbol of SS/PBCH block and ends up with the last symbol of the SS/PBCH block. For multiplexing pattern 3, the PDSCH starts right after the last symbol of RMSI CORESET and ends up with the last symbol of the SS/PBCH block.

For multiplexing pattern 1, considering a half-slot/full-slot and assuming no gap between RMSI CORESET(s) and corresponding PDSCH, all M values (which can take a value of ½, 1, or 2), possible combinations of CORESET and the PDSCH positions in the time domain (tables 13.11-13.12 in R1-1801293, CR for 38.213) can be summarized as set forth below.

For M=½, there will be two RMSI CORESETs in one slot, and the possible first symbol index of RMSI CORESET may be 0, $N_{symb}^{CORESET}$ (number of symbols in time domain in a CORESET) (1 or 2 or 3), 7. The start symbol index of PDSCH may be X=1, 2, 3, 4, 6, 8, 9, 10 and the length of PDSCH may be Y=14−X (any X) or 7−X (X<6).

For M=1, there will be one RMSI CORESET in one slot, and the possible first symbol index of RMSI CORESET may be 0, 1, 2. The start symbol index of PDSCH may be X=1, 2, 3, 4, 5 and the length of PDSCH may be Y=14−X (X<13) or 7−X (X<6).

For M=2 (applicable for frequency range 2, i.e., above 6 GHz, only), there will be one RMSI CORESET in one slot, and the possible first symbol index of RMSI CORESET may be 0. The start symbol index of PDSCH may be X=1, 2, 3 and the length of PDSCH may be Y=14−X (X<13) or 7−X (X<6).

If the above are combined, it is sufficient to have a fixed table with 14 entries for different PDSCH start symbol in one slot X=1, 2, 3, 4, 5, 6, 8, 9, 10. The length of PDSCH may simply be Y=14−X (X<13) or 7−X (X<6). It should be noted that any uplink symbols (if existent) in this slot may be precluded for PDSCH scheduling.

TABLE 1 below illustrates configurations that can be combined with allowed CORESET configurations for multiplexing pattern 1 without gap symbols between the CORESET and PDSCH allocations.

TABLE 1

| Index | K0 | Start symbol | Symbol Length |
|---|---|---|---|
| 0 | 0 | 1 | 6 |
| 1 | 0 | 2 | 5 |
| 2 | 0 | 3 | 4 |
| 3 | 0 | 4 | 3 |
| 4 | 0 | 5 | 2 |
| 5 | 0 | 1 | 13 |
| 6 | 0 | 2 | 12 |
| 7 | 0 | 3 | 11 |
| 8 | 0 | 4 | 10 |
| 9 | 0 | 5 | 9 |
| 10 | 0 | 6 | 8 |
| 11 | 0 | 8 | 6 |
| 12 | 0 | 9 | 5 |
| 13 | 0 | 10 | 4 |

In order to support more default scheduling possibilities, the information DL-DMRS-typeA-pos={2, 3} in a master information block ("MIB") may be used to tie with the start position S, which is likely coupled in practice to the values signaled in DL-DMRS-typeA-pos. Use x to replace the S value, where x=DL-DMRS-typeA-pos.

TABLE 2

| | Default PDSCH Table | | | |
|---|---|---|---|---|
| i | PDSCH mapping type | $K_0$ | S | L |
| 0 | Type A | 0 | 1 | 6 |
| 4 | Type A | 0 | x | 14 − x |
| 5 | Type A | 0 | x | 12 − x |
| 6 | Type A | 0 | x | 11 − x |
| 7 | Type A | 0 | x | 10 − x |
| 8 | Type A | 0 | x | 9 − x |

TABLE 2-continued

| | Default PDSCH Table | | | |
|---|---|---|---|---|
| i | PDSCH mapping type | $K_0$ | S | L |
| 9 | Type A | 0 | x | 8 − x |
| 10 | Type A | 0 | x | 7 − x |
| 1 | Type A | 0 | 4 | 10 |
| 11 | Type A | 0 | 4 | 3 |
| 12 | TypeB | 0 | 5 | 9 |
| 2 | Type A | 0 | 5 | 2 |
| 13 | Type B | 0 | 6 | 8 |
| 14 | Type B | 0 | 6 | 4 |
| 3 | Type A | 0 | 9 | 5 |
| 15 | Type B | 0 | 10 | 4 |

In an embodiment, TABLE 2, illustrated above, describes a default time domain allocation table for the PDSCH. It makes use of DL-DMRS-typeA-pos to give possibilities for more configurations.

In another embodiment, for multiplexing pattern 2, the PDSCH scheduled by the PDCCH in the PBCH configured CORESET starts from the first symbol of the SS/PBCH block and ends up with the last symbol of the SS/PBCH block.

In another embodiment, for multiplexing pattern 3, the PDSCH scheduled by the PDCCH in the PBCH configured CORESET starts right after the last symbol of the RMSI CORESET and ends up with the last symbol of the SS/PBCH block.

For a PUSCH transmission, a default table is defined with an offset K2 indicating the time in number of slots that the user equipment ("UE") should transmit the PUSCH transmission after the slot that the UE has received the grant. The offset K2 value should satisfy a UE capability requirement, the processing time needed by the UE from the last symbol that the UE received over the PDCCH to the first symbol that the UE can transmit over the PUSCH, which is defined in 3GPP Technical Specification 36.213. The default table could later get overwritten by a system information block ("SIB")1 for a different network configuration.

TABLE 3 below is proposed as default time domain allocation for PUSCH:

TABLE 3

| | Default Time Domain Allocation for PUSCH | | | |
|---|---|---|---|---|
| Index | K2 | Start symbol | Symbol Length | type |
| 0 | 2 | 0 | 14 | A |
| 1 | 3 | 0 | 14 | A |
| 2 | 2 | 0 | 10 | A |
| 3 | 3 | 0 | 10 | A |
| 4 | 2 | 0 | 10 | A |
| 5 | 3 | 0 | 10 | A |
| 6 | 7 | 0 | 14 | A |
| 7 | 8 | 0 | 14 | A |
| 8 | Reserved | reserved | reserved | reserved |
| 9 | Reserved | reserved | reserved | reserved |
| 10 | Reserved | reserved | reserved | reserved |
| 11 | Reserved | reserved | reserved | reserved |
| 12 | Reserved | reserved | reserved | reserved |
| 13 | Reserved | reserved | reserved | reserved |
| 14 | Reserved | reserved | reserved | reserved |
| 15 | Reserved | reserved | reserved | reserved |

In another embodiment, TABLE 3 is proposed as a default time domain allocation table for PUSCH.

A MSG3 can be used as the default PUSCH table in initial access procedure. Time alignment ("TA") is used by the network to inform a UE how it should adjust its time when sending an uplink message. The maximum TA in NR is designed to cover a cell range of 200-300 kilometers ("km") and with 15 KHz subcarrier spacing. The initial timing advance value is measured in a gNB and sent to the UE via a random access response ("RAR") grant, and that value depends on the distance between the UE and the gNB. The extra time that the UE needs to adjust its transmission in addition to the processing time is based on network measurements, or more likely the cell range, if the gNb wants to simplify the scheduling by addressing the same time gap for transmission of the MSG3 for all UEs in the cell. The time used in the MSG3 scheduling to cover the time alignment is network implementation dependent. TABLE 4 below shows the time difference between a normal PUSCH scheduling in the columns identified as "N2+d_2(0~1), TA_max, and Normal PUSCH, and MSG3 scheduling in the columns identified as N1+d_1(0~1), 0.5 ms, Range in Nr symbols, and Range in slots.

The TA value for a normal cell of range 15 km for 15 k scs in number of symbols is 2, and the unnecessary latency is about 2 slots if it is forced to address the maximum TA value on the MSG3. The TA value for MSG3 together with the specific processing time for MSG3 can be included in TABLE 4 below, the values proposed are aligned with the maximum cell range supported for NR. For latency concerns, that table should also be reconfigurable via SIB1 so the MSG3 latency is addressed to the actual cell range. One more reason to have that configuration is to cover cases if UE processing time is changed or to support sending MSG3 in a different numerology. The UE may always use this MSG3 timing offset table in addition to the time indicated in the time domain ("TD") allocation PUSCH table for MSG3 transmission with TC-RNTI.

In section 8.3 of 3GPP TS 38.213, a minimum time between the last symbol on PDSCH contains RAR and the first symbol for the UE of a corresponding MSG3 PUSCH transmission is defined as $N\_t1+N\_t2+N\_ta\_max+0.5$ ms. $N\_t1$ and $N\_t2$ is the UE processing time defined in a table in 3GPP TS 28.214. For numerology 1, $N\_t1+N\_t2$ gives about 22 to 25 symbols; $N\_ta\_max$ is the maximum timing adjustment value that can be provided by the TA command in RAR, which is approximately 2 slots. For normal PUSCH transmissions, it requires only $N\_t2$ that is 12 symbols. A separate table is introduced to address the additional timing needed by MSG3. The number of slots K3 should be added in addition to the K2 value in PUSCH table.

Calculation for the time difference between MSG3 and normal PUSCH is shown below in TABLE 4.

TABLE 4

Message 3 (MSG3) K3 additional time table as default

| Numerology | N1 + d_1(0~1) | | N2 + d_2(0~1) | 0.5 ms | TA_max | Range in Nr symbols | Range in slots | Normal PUSCH |
| --- | --- | --- | --- | --- | --- | --- | --- | --- |
| | No additional DMRS | Additional DMRS | | | | | | |
| 0 | 8, 9 | 13, 14 | 10, 11 | 7 | 28 | 25~60 | 2~5 | 1~3 |
| 1 | 10, 11 | 13, 14 | 12, 13 | 14 | 28 | 36~69 | 3~5 | 1~3 |
| 2 | 17, 18 | 20, 21 | 23, 24 | 28 | 28 | 68~101 | 5~8 | 2~4 |
| 3 | 20, 21 | 24, 25 | 36, 37 | 48 | 28 | 104~138 | 8~10 | 3~5 |

For MSG3, a separate K3 value is used or to indicate the additional processing time and the TA time differences from normal PUSCH in the number of slots, UE should add offset K3 to the offset K2.

The time difference between MSG3 and normal PUSCH in a table covers maximum supported timing advance.

TABLE 5 shows a MSG3 K3 additional time as a default.

TABLE 5

| Numerology | 0 | 1 | 2 | 3 |
| --- | --- | --- | --- | --- |
| Additional MSG3 offset K3 | 2 | 2 | 4 | 5 |

The MSG3 K3 should be configurable; the range for each offset K3 can have 3 bits.

In another embodiment, TABLE 5 shown above is used as an additional time table for MSG3. The UE should always add the additional number of slots for offset K3 onto the offset K2 value from PUSCH table to derive the transmission slot for MSG3. The table should be reconfigurable via SIB1 to improve MSG3 latency.

The process listed below illustrates computation of a PUSCH configuration:

```
PUSCH-ConfigCommon ::=                    SEQUENCE {
-- Sequence-group hopping can be enabled or disabled by means of this cell-specific
``` parameter.
    -- Corresponds to L1 parameter 'Group-hopping-enabled-Transform-precoding' (see
TS 38.211)
    -- This field is Cell specific
groupHoppingEnabledTransformPrecoding ENUMERATED
{enabled}    OPTIONAL,   -- Need R
    -- List of time domain allocations for timing of UL assignment to UL data
    pusch-AllocationList  SEQUENCE (SIZE(1..maxNrofUL-Allocations)) OF
PUSCH-TimeDomainResourceAllocation OPTIONAL,   -- Need R
    msg3-DeltaPreamble                          INTEGER (-1..6)
msg3-TimingOffsetList SEQUENCE (SIZE(1..maxNrofNumerologies)

For the TD allocation for system information, the SI-RNTI is used to carry the initial network system configurations. No other network information that characterizes the network configuration has been indicated to a UE, so the configuration of the TD allocation must be more flexible to satisfy different network requirements. The examples below demonstrate improving the configuration flexibility on SI-RNTI.

System information is sent to all UEs; this helps a UE to become updated with network configurations. A UE reads the system information both at the state before initial access and after RRC-connected, when it is paged to reread system information for an update. Interpretation of TD-allocation for SI-RNTI should be consistent for all UEs.

In 3GPP meeting RAN1 Ad-Hoc #1801, the following concepts were discussed regarding the DCI format for RMSI/OSI/paging and random access. Detailed content of DCI has yet to be determined. NR supports a DCI format having the same size as the DCI format 1_0 to be used for scheduling RMSI/OSI, both for paging and for random access.

To support system information carried by SI-RNTI with a more flexible time domain allocation, these two options fulfil the flexibility requirement from the network side. A fixed table to include different configurations of a different favor or an explicit TD allocation can be used.

The RRC configured table should not be used for SI-RNTI; in this way the association between the system information allocation and other data transmission is decoupled.

In a first option, a fixed table is always referred to in a specification to indicate the TD allocation for DCI scrambled with SI-RNTI.

In a second option, time domain allocation for system information carried by PDCCH scrambled with SI-RNTI should have the flexibility of any start symbol and symbol lengths within one slot. The TD-allocation should not get limited with a pre-defined fixed number of configuration entries.

TABLE 6 below illustrates various fields associated with a time domain allocation.

TABLE 6

| Field | Bits | Comment |
|---|---|---|
| Identifier for DCI formats | 1 | Reserved |
| Frequency domain resource assignment | $\lceil \log_2 (N_{RB}^{DL,BWP}(N_{RB}^{DL,BWP} + 1)/2) \rceil$ | |
| Time domain resource assignment | 7 | Use SLIV to present any start symbol and symbol length within the 14 symbols. |

TABLE 6-continued

| Field | Bits | Comment |
|---|---|---|
| Time offset K0 | 1 or 2 bits | Number of slots from current PDCCH received slot |
| DMRS (demodulation reference signal) pattern | 1 | indicate if type A or type B to use for DMRS pattern. |
| VRB-to-PRB mapping | 1 | |
| Modulation and coding scheme | [4] | Same MCS table as for "normal" transmission without 256QAM, only lowest part used. |
| New data indicator | 1 | Reserved |
| Redundancy version | 2 | Reserved |
| HARQ (hybrid automatic retransmission request) process number | 4 | Reserved |
| Downlink assignment index | 2 | Reserved |
| TPC command for scheduled PUCCH | 2 | Reserved |
| PUCCH resource indicator | 3 | Reserved |
| PDSCH-to-HARQ_feedback timing indicator | 3 | Reserved |

In an embodiment, for consistency, the TD allocation of system information should always refer to a same fixed table. For both consistency and flexibility, the TD allocation of system information should be explicitly configured with a start symbol, a symbol length, an offset K0, and DMRS type in the PDCCH associated with system information.

Overwriting rules are provided for a default table, an SIB1 table, and a dedicated table. In 3GPP meeting RAN1 #92, the concepts below were discussed with respect to providing a possibility to configure the time domain allocation table in SIB1 (RMSI).

The concepts include requesting RAN2 to introduce a possibility for providing an RRC-configured table in RMSI to configure PDSCH and PUSCH symbol allocation for PDSCH/PUSCH scheduling after RMSI, where the RRC-configurable table via dedicated signaling was previously addressed in RAN1.

The PDSCH/PUSCH table is defined per bandwidth part ("BWP") in RRC configuration. To clarify which table should be used by a UE, upon receiving PDCCH scrambled with C-RNTI, which is associated with a common search space (CSS) or a UE specific search space (USS), P-RNTI (associated with a CSS), CS-RNTI (associated with a CSS and a USS), RA-RNTI (associated with a CSS), TC-RNTI (associated with a CSS and a USS), SP-CSI-RNTI (associated with a USS DCI0_1), following rules should be applied.

If an SIB1 or a dedicated RRC table has not been received by a UE, the UE applies the index number indicated in DCI with the default PDSCH/PUSCH table to interpret the TD allocation.

If SIB1 configured table (a common configuration) has been received by a UE, that table overwrites the default table, and the UE interprets the TD allocation with an SIB1-configured PDSCH/PUSCH table.

If RRC configured dedicated table for initial BWP has been received by the UE, that table overwrites the SIB1-configured table and the default table.

If only an RRC-configured, dedicated table for other BWP than an initial BWP has been received by the UE, the UE applies the RRC-configured table only for the BWP that the dedicated table configured to when PDCCH is received indicates a transmission for that BWP. If the PDCCH indicates a transmission for the initial BWP, the UE uses the SIB1 table if it has been configured, otherwise uses the default table, to interpret the TD allocation.

In another embodiment, if a dedicated table has not been received via RRC for the BWP at receiving C-RNTI, P-RNTI, CS-RNTI, the UE should apply the SIB1-configured or default PUSCH/PDSCH TD allocation table for current BWPs.

In another embodiment, RA-RNTI and TC-RNTI and P-RNTI should always use the SIB1 PDSCH/PUSCH table, if configured, or the default table.

Thus, the following items regarding time and frequency domain resource allocations have been described:

In one embodiment, TABLE 2 is proposed as the default time domain allocation table for PDSCH. DL-DMRS-typeA-pos is used to give possibilities for more configurations.

In another embodiment, for multiplexing pattern 2, PDSCH scheduled by PDCCH in PBCH configured CORESET starts from the first symbol of SS/PBCH block and ends with the last symbol of SS/PBCH block.

In another embodiment, for multiplexing pattern 3, PDSCH scheduled by PDCCH in PBCH configured CORESET starts right after the last symbol of RMSI CORESET and ends with the last symbol of SS/PBCH block.

In another embodiment, TABLE 3 is employed as the default time domain allocation table for PUSCH.

In another embodiment, TABLE 5 is used as additional time table for MSG3. A UE should always add the additional number of slots for offset K3 onto the K2 offset value from PUSCH table to derive the transmission slot for the MSG3. The table should be reconfigurable via SIB1 to improve MSG3 latency.

In another embodiment, for consistency, the TD allocation of system information should always refer to same fixed table. For both consistency and flexibility, the TD allocation of system information should be explicitly configured with a start symbol, a symbol length, an offset K0 and DMRS type in the PDCCH associated with system information.

In another embodiment, if no dedicated table has been received via RRC for the BWP at receiving C-RNTI, P-RNTI, CS-RNTI, the UE should apply the SIB1 configured or default PUSCH/PDSCH TD-allocation table for current BWPs.

In another embodiment, RA-RNTI and TC-RNTI and P-RNTI should always use the SIB1 PDSCH/PUSCH table, if configured, or a default table.

Figure 9:
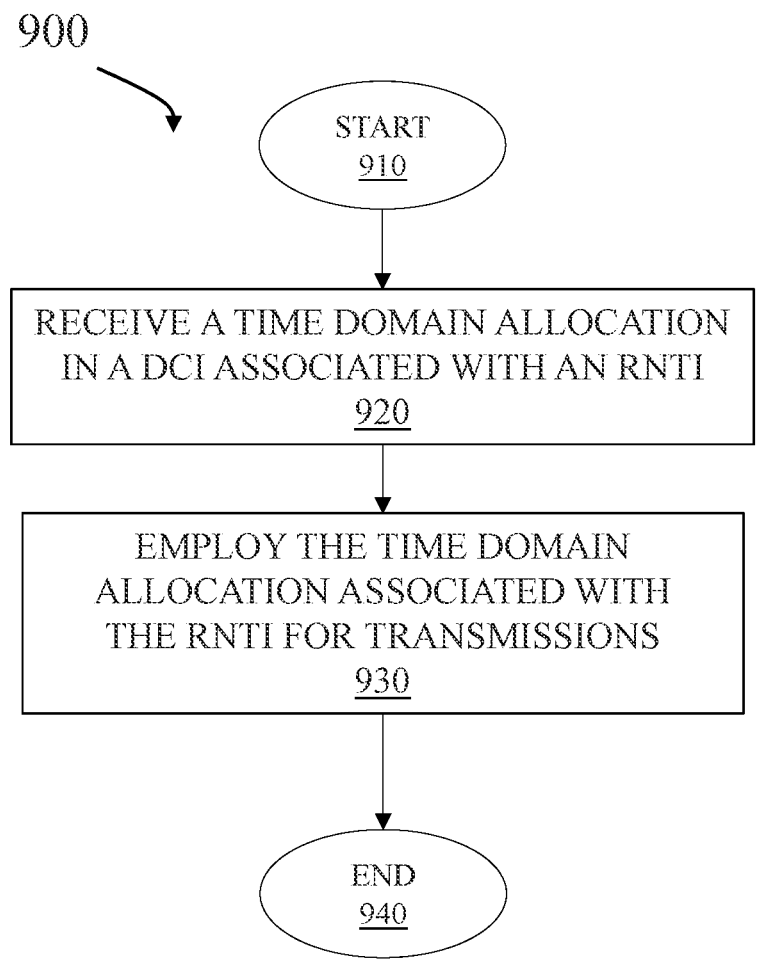
FIGS. 9 and 10 illustrate flow diagrams of embodiments of operating a communication system.

Turning now FIG. 9, illustrated is a flow diagram of an embodiment of a method 900 of operating a communication system. The method 900 performed by a user equipment in the communication system begins at a start step or module 910 and then, at a step or module 920, the user equipment receives a time domain allocation (or an indication thereof) in downlink control information associated with a radio network temporary identifier ("RNTI") identifying the user equipment and/or group of user equipment. The downlink control information including the time domain allocation may be received from a radio access node in a physical downlink control channel ("PDCCH") scrambled with the RNTI.

At a step or module 930, the user equipment employs the time domain allocation associated with the RNTI for transmissions (such as downlink transmissions) associated therewith. If the RNTI is a system information-radio network temporary identifier ("SI-RNTI"), the user equipment receives system information using the time domain allocation associated with the SI-RNTI. The user equipment may employ an entry from a table indexed by the indication of the time domain allocation associated with the RNTI for transmissions associated with the user equipment. The table may depend on a type of RNTI. Another indication of the time domain allocation may be from a master information block ("MIB"). For example, the user equipment may relate a parameter from the MIB to the entry from the table indexed by the time domain allocation associated with the RNTI for transmissions associated with the user equipment. The type of RNTI includes a random access ("RA")-RNTI, a paging ("P")-RNTI, a temporary cell ("TC")-RNTI, a configured scheduling ("CS")-RNTI, a system information ("SI")-RNTI and/or a cell ("C")-RNTI. The user equipment is configured to employ the time domain allocation associated with the RNTI for uplink transmissions (e.g., over a physical uplink shared channel ("PUSCH")) and/or for downlink transmissions (e.g., over a physical downlink shared channel ("PDSCH")). The method 900 ends at an end step or module 940.

Furthermore, the time domain allocation associated with the RNTI may be a function of a synchronization signal/physical broadcast channel ("SS/PBCH") block and control resource set ("CORESET") multiplexing pattern. The time domain allocation associated with the RNTI may include a default time domain allocation and/or a dedicated time domain allocation. The time domain allocation associated with the RNTI may include a common time domain allocation from a system information block ("SIB"). The time domain allocation associated with a cell ("C")-RNTI or a configured scheduling ("CS")-RNTI may be a dedicated time domain allocation. The user equipment may employ a dedicated time domain allocation in lieu of a default time domain allocation or a common time domain allocation depending on the RNTI for transmissions associated with the user equipment.

Figure 10:
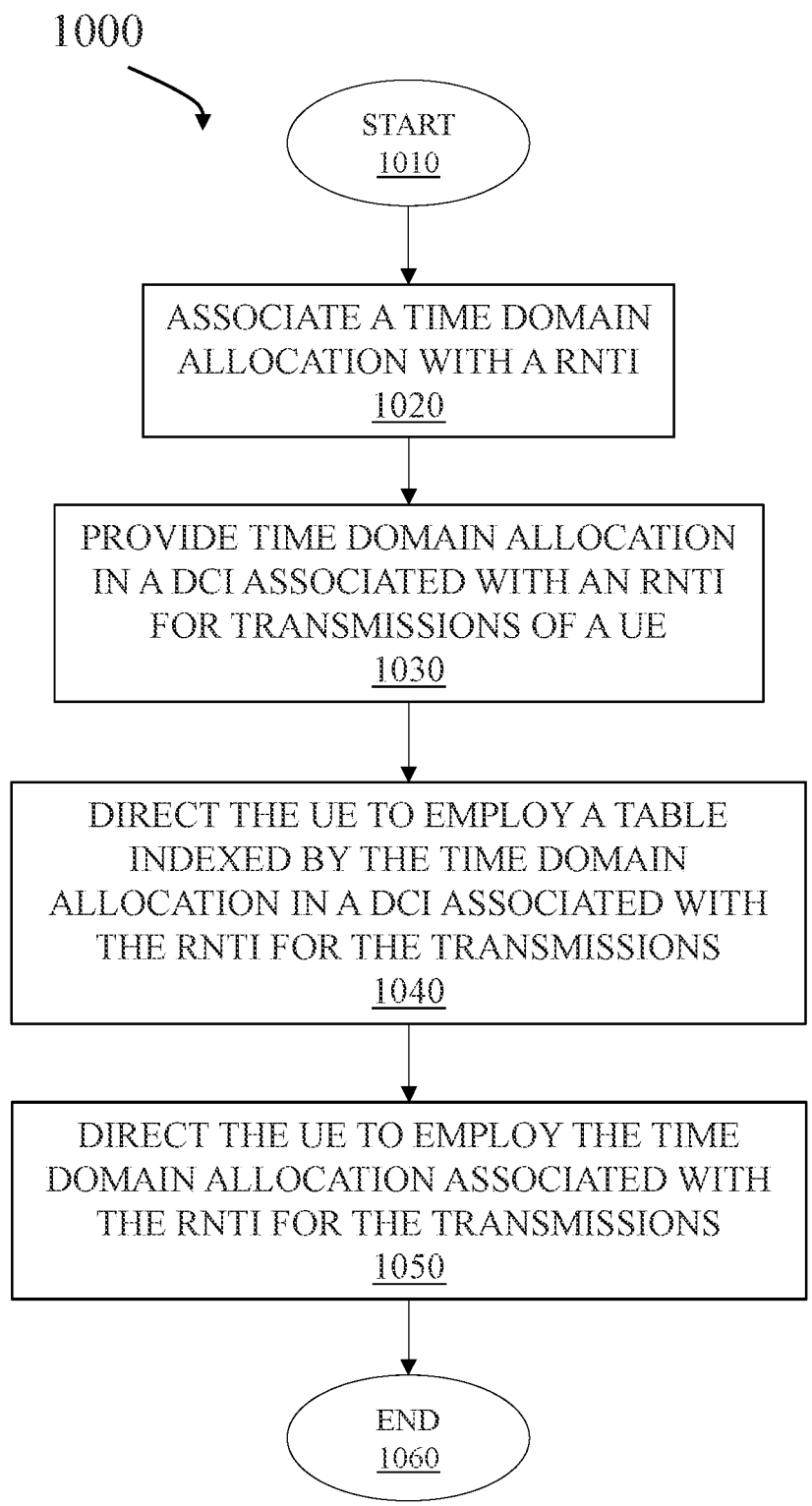

Turning now FIG. 10, illustrated is a flow diagram of an embodiment of a method 1000 of operating a communication system. The method 1000 performed by a radio access node in the communication system begins at a start step or module 1010 and then, at a step or module 1020, the radio access node associates a time domain allocation with a radio network temporary identifier ("RNTI") identifying a user equipment and/or group of user equipment. At a step or module 1030, the radio access node provides the time domain allocation (or an indication thereof) in downlink control information to allow the user equipment to employ the time domain allocation associated with the RNTI for transmissions associated therewith. The downlink control information including the time domain allocation may be provided in a physical downlink control channel ("PDCCH") scrambled with the RNTI. If the RNTI is a system information-radio network temporary identifier ("SI-RNTI"), the radio access node provides system information using the time domain allocation associated with the SI-RNTI.

At a step or module 1040, the radio access node directs the user equipment to employ an entry from a table indexed by the indication of the time domain allocation associated with the RNTI for transmissions associated therewith. The table may depend on a type of RNTI. Another indication of the time domain allocation may be from an MIB. For example, the radio access node may direct the user equipment to relate a parameter from the MIB to the entry from the table indexed by the time domain allocation associated with the RNTI for transmissions associated therewith. The type of RNTI includes a random access ("RA")-RNTI, a paging ("P")-RNTI, a temporary cell ("TC")-RNTI, a configured scheduling ("CS")-RNTI, a system information ("SI")-RNTI and/or a cell ("C")-RNTI.

At a step or module 1050, the radio access node is configured to direct the user equipment to employ the time domain allocation associated with the RNTI for uplink transmissions (e.g., over a physical uplink shared channel ("PUSCH")) and/or for downlink transmissions (e.g., over a physical downlink shared channel ("PDSCH")). The method 1000 ends at an end step or module 1060.

Furthermore, the time domain allocation associated with the RNTI may be a function of a synchronization signal/physical broadcast channel ("SS/PBCH") block and control resource set ("CORESET") multiplexing pattern. The time domain allocation associated with the RNTI may include a default time domain allocation and/or a dedicated time domain allocation. The time domain allocation associated with the RNTI may include a common time domain allocation from a system information block ("SIB"). The time domain allocation associated with a cell ("C")-RNTI or a configured scheduling ("CS")-RNTI may be a dedicated time domain allocation. The radio access node is configured to direct the user equipment to employ a dedicated time domain allocation in lieu of a default time domain allocation or a common time domain allocation depending on the RNTI for transmissions associated with the user equipment.

Thus, a system and method for providing time domain allocations in a communication system has been introduced herein. In one embodiment (and with continuing reference to the aforementioned FIGUREs), an apparatus (such as a user equipment 105, 200 with processing circuitry 205) is operable in a communication system (100) and configured to receive a time domain allocation (or an indication thereof) in downlink control information associated with a radio network temporary identifier ("RNTI") identifying the apparatus (105, 200), and employ the time domain allocation associated with the RNTI for transmissions associated with the apparatus (105, 200). In another embodiment (and with continuing reference to the aforementioned FIGUREs), an apparatus (such as a radio access node 110, 300 with processing circuitry 305) is operable in a communication system (100) and configured to associate a time domain allocation with a radio network temporary identifier ("RNTI") identifying a user equipment (105, 200), and provide the time domain allocation (or an indication thereof) in downlink control information to allow the user equipment (105, 200) to employ the time domain allocation associated with the RNTI for transmissions associated therewith.

As described above, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. A host computer configured to operate in a communication system to provide an over-the-top (OTT) service, the host computer comprising:
   processing circuitry configured to initiate transmissions to receive or provide user data associated with the OTT service; and
   a network interface configured to facilitate reception or transmission of the user data from a user equipment (UE) via a network node in a cellular network, the network node having a communication interface and processing circuitry, the processing circuitry of the network node configured to perform operations comprising:
      associating a time domain allocation with a radio network temporary identifier (RNTI) identifying a UE;
      providing an indication of the time domain allocation in downlink control information to allow the UE to employ the time domain allocation associated with the RNTI for transmissions associated therewith; and directing the UE to employ an entry from a table indexed by the time domain allocation associated with the RNTI for transmissions associated therewith, wherein
the table depends on a type of RNTI.

2. The host computer as recited in claim 1, wherein the network node further performs directing the user equipment to employ the time domain allocation associated with the RNTI for uplink transmissions over a physical uplink shared channel ("PUSCH") and/or for downlink transmissions over a physical downlink shared channel ("PDSCH").

3. The host computer as recited in claim 1, wherein the time domain allocation associated with the RNTI is a function of a synchronization signal/physical broadcast channel (SS/PBCH) block and control resource set (CORESET) multiplexing pattern.

4. The host computer as recited in claim 1, wherein the time domain allocation associated with the RNTI is a default time domain allocation.

5. The host computer as recited in claim 1, wherein the time domain allocation associated with the RNTI is a common time domain allocation from a system information block (SIB).

6. The host computer as recited in claim 1, wherein the time domain allocation associated with the RNTI is a dedicated time domain allocation.

7. The host computer as recited in claim 1, wherein the type of RNTI includes at least one of a random access (RA)-RNTI, a paging (P)-RNTI, a temporary cell (TC)-RNTI, a configured scheduling (CS)-RNTI, a system information (SI)-ANTI, and a cell (C)-RNTI.

8. The host computer as recited in claim 1, wherein the time domain allocation associated with the RNTI is a default time domain allocation.

9. A host computer comprising:
processing circuitry configured to provide user data; and
a communication interface configured to forward user data to a cellular network for transmission to a user equipment (UE),
the UE being operable to determine a time-domain allocated to the UE by a base station for a scheduled transmission in downlink, and the UE comprising a radio interface, memory operable to store instructions and processing circuitry operable to execute the instructions, whereby the UE is operable to:
receive an indication of a time domain allocation in downlink control information associated with a radio network temporary identifier (RNTI) identifying the UE; and
employ the time domain allocation associated with the RNTI for transmissions associated with the UE,
wherein employing the time domain allocation includes employing an entry from a table indexed by the indication of the time domain allocation associated with the RNTI for transmissions associated with the UE, and
wherein the table depends on a type of RNTI.

10. The host computer as recited in claim 9, wherein the downlink control information including the indication of the time domain allocation is scrambled with the RNTI.

11. The host computer as recited in claim 9, wherein the type of RNTI includes at least one of a random access (RA)-RNTI, a paging (P)-RNTI, a temporary cell (TC)-RNTI, a configured scheduling (CS)-RNTI, a system information (SI)-RNTI, and a cell (C)-RNTI.

12. The host computer as recited in claim 9, wherein the UE is configured to employ the time domain allocation associated with the RNTI for uplink transmissions over a physical uplink shared channel (PUSCH) and/or for downlink transmissions over a physical downlink shared channel (PDSCH).

13. The host computer as recited in claim 9, wherein the time domain allocation associated with the RNTI is a function of a synchronization signal/physical broadcast channel (SS/PBCH) block and control resource set (CORESET) multiplexing pattern.

14. The host computer as recited in claim 9, wherein the time domain allocation associated with the RNTI is a default time domain allocation.

15. The host computer as recited in claim 9, wherein the time domain allocation associated with the RNTI is a common time domain allocation from a system information block (SIB).

16. The host computer as recited in claim 9, wherein the time domain allocation associated with the RNTI is a dedicated time domain allocation.

* * * * *

UNITED STATES PATENT AND TRADEMARK OFFICE
CERTIFICATE OF CORRECTION

| | | |
|---|---|---|
| PATENT NO. | : 12,052,777 B2 | Page 1 of 2 |
| APPLICATION NO. | : 18/352480 | |
| DATED | : July 30, 2024 | |
| INVENTOR(S) | : Zhang et al. | |

It is certified that error appears in the above-identified patent and that said Letters Patent is hereby corrected as shown below:

On the Title Page

Item [72], in Column 1, Line 5, delete "Josè," and insert -- Jose, --, therefor.

Item [56], in Column 2, Line 2, delete "Tirola" and insert -- Tiirola --, therefor.

In the Specification

In Column 1, Line 6, delete "2022," and insert -- 2022, now U.S. Pat. No. 11,832,319, --, therefor.

In Column 1, Line 11, delete "application" and insert -- application Ser. No. --, therefor.

In Column 1, Line 27, delete "("NW")" and insert -- ("NR") --, therefor.

In Column 1, Line 28, delete "Program" and insert -- Project --, therefor.

In Column 2, Line 54, delete "Program" and insert -- Project --, therefor.

In Column 3, Line 39, delete "directly" and insert -- direct --, therefor.

In Column 3, Line 47, delete "("RAT")" and insert -- ("IRAT") --, therefor.

In Column 11, Line 8, delete "use equipment" and insert -- user equipment --, therefor.

In Column 12, Line 14, delete "slot frame indication" and insert -- slot format indicator --, therefor.

In Column 14, Line 11, delete "verses" and insert -- versus --, therefor.

In Column 20, Line 27, delete "retransmission" and insert -- repeat --, therefor.

Signed and Sealed this
Eighteenth Day of February, 2025

Coke Morgan Stewart
*Acting Director of the United States Patent and Trademark Office*

In the Claims

In Column 25, Line 32, in Claim 7, delete "(SI)-ANTI," and insert -- (SI)-RNTI, --, therefor.